US009133810B2

(12) United States Patent
Kees et al.

(10) Patent No.: US 9,133,810 B2
(45) Date of Patent: Sep. 15, 2015

(54) METHOD AND APPARATUS FOR STARTING AN ENGINE

(71) Applicant: Ford Global Technologies, LLC, Dearborn, MI (US)

(72) Inventors: Donatus Andreas Josephine Kees, Billericay (GB); James Andrew Straker, Brentwood (GB); Daniel Benjamin Kok, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/143,365

(22) Filed: Dec. 30, 2013

(65) Prior Publication Data

US 2014/0191513 A1 Jul. 10, 2014

(30) Foreign Application Priority Data

Jan. 10, 2013 (GB) ................................... 1300414.8

(51) Int. Cl.

*F02N 11/00* (2006.01)
*H02P 9/04* (2006.01)
*F02N 11/10* (2006.01)
*F02N 11/08* (2006.01)
*F02N 15/00* (2006.01)

(52) U.S. Cl.

CPC ............ *F02N 11/006* (2013.01); *F02N 11/108* (2013.01); *F02N 11/0814* (2013.01); *F02N 15/006* (2013.01); *F02N 2200/14* (2013.01)

(58) Field of Classification Search

USPC .......... 290/38 R; 123/179.25; 310/83; 74/7 A
See application file for complete search history.

(56) References Cited

U.S. PATENT DOCUMENTS

| | | | | |
|---|---|---|---|---|
| 4,116,077 | A * | 9/1978 | Mazzorana | 74/7 A |
| 4,958,097 | A * | 9/1990 | Woodward et al. | 310/83 |
| 5,895,993 | A * | 4/1999 | Kajino et al. | 310/83 |
| 6,658,949 | B2 * | 12/2003 | Saito et al. | 74/7 A |
| 6,959,619 | B2 * | 11/2005 | Saito et al. | 74/7 A |
| 8,319,356 | B2 * | 11/2012 | Fonseca | 290/1 A |
| 8,479,698 | B2 * | 7/2013 | Wanner et al. | 123/179.3 |
| 8,598,728 | B2 * | 12/2013 | Navetta | 290/47 |
| 8,776,753 | B2 * | 7/2014 | Bradfield et al. | 123/179.25 |
| 2008/0283012 | A1 * | 11/2008 | Wanner | 123/179.25 |
| 2010/0038961 | A1 * | 2/2010 | Divito et al. | 307/9.1 |
| 2011/0175357 | A1 * | 7/2011 | Navetta | 290/47 |
| 2013/0167790 | A1 * | 7/2013 | Bradfield et al. | 123/179.25 |
| 2014/0290615 | A1 * | 10/2014 | Bradfield et al. | 123/179.25 |

FOREIGN PATENT DOCUMENTS

JP H01138369 A 5/1989

* cited by examiner

*Primary Examiner* — Pedro J Cuevas
(74) *Attorney, Agent, or Firm* — David Kelley; Alleman Hall McCoy Russell & Tuttle LLP

(57) ABSTRACT

A method of starting an engine is disclosed in which two or more starter motors are used to start the engine in an alternating sequence so as to equalize wear and reduce the wear of each starter motor by a factor equal to the number of starter motors provided. The starter motors are preferably positioned so as to minimize overlap between wear patterns produced by the starter motors on a cooperating ring gear 8 thereby extending the life of the ring gear.

18 Claims, 8 Drawing Sheets

METHOD AND APPARATUS FOR STARTING AN ENGINE

CROSS REFERENCE TO RELATED APPLICATIONS

The present application claims priority to Great Britain Patent Application No. 1300414.8, entitled "A Method and Apparatus for Starting an Engine," filed on Jan. 10, 2013, the entire contents of which are hereby incorporated by reference for all purposes.

FIELD

The present description relates to internal combustion engines and, in particular, to a method and apparatus for starting such an engine.

BACKGROUND AND SUMMARY

Currently, 12V starter motors and enhanced 12V starter motors are the most cost effective engine cranking devices. An enhanced starter motor has the capability to deliver circa 300,000 starts during a 150,000 mile 10-year vehicle lifetime. The ring gear with which the starter motor engages has the capability to deliver circa 400,000 starts over the same 150,000 mile 10-year vehicle lifetime.

In modern micro hybrid, mild hybrid, full hybrid or plug-in hybrid vehicles, engine stop-starts are required when the vehicle is stationary as well as when the vehicle is rolling. The required number of engine starts during a typical 150,000 mile 10-year vehicle life is greater than either an enhanced starter motor or a wear optimized ring gear are able to provide and cost effective alternatives are not available. Therefore, it may be difficult for an engine starting system to achieve a desired number of engine starts over a prescribed duration.

It is an object of the present description to provide a method of starting an engine and an apparatus for starting an engine that provide an increased service life in an economical manner.

The inventors herein have recognized the above-mentioned challenges and have developed a method for starting an engine having a starting apparatus including at least two starter motors wherein the method comprises sharing starting of the engine between the starter motors to equalize the wear of the starter motors and reduce the number of engine starts performed by each starter motor. The number of starts performed by each starter motor may be equal to the total number of engine starts performed divided by the total number of active starter motors. The number of starts performed by each starter motor may be equal to the total number of engine starts performed in a period of time divided by the total number of active starter motors in the period of time.

In one example, no active starter motor may be used for two consecutive engine starts. Further, each starter motor may be engageable with a ring gear to start the engine and may produce a respective wear pattern on the ring gear and the starter motors may be positioned so as to minimize overlap between the respective wear patterns produced by the starter motors. There may be first and second starter motors and the two starter motors may be used in an alternating sequence. The method may further comprise checking to see whether the engine has started following the use of a respective starter motor and, if the engine has not been started by the respective starter motor using another starter motor to start the engine and deactivating the respective degraded starter motor. The method may further comprise providing a warning to a user of the engine that the respective starter motor has become degraded. The method may further comprise providing a warning to a user of the engine of a total system degradation condition if all of the starter motors have not started the engine.

By selecting which of two starters is to start an engine, it may be possible to extend an amount of time for starter degradation. For example, it may be possible to double a time interval or a number of engine restarts between starter degradation. As a result, a vehicle that is automatically stopped and restarted may be serviced for a degraded starter at nearly the same time or number of engine starts as an engine that is not automatically stopped and restarted.

According to a second aspect of the description there is provided an apparatus for starting an internal combustion engine having a flywheel connected to a crankshaft of the engine wherein the apparatus comprises a starter ring gear fastened to the flywheel, at least two starter motors each having a pinion wheel for selective engagement with the ring gear and an electronic controller to control the operation of the starter motors wherein the electronic controller is operable to use the starter motors in a predefined sequence to equalize wear of the starter motors and reduce the number of starts performed by each starter motor.

The electronic controller may operate the starter motors so that the number of starts performed by each starter motor is equal to the total number of engine starts performed divided by the total number of active starter motors. In one example, no active starter motor may be used for two consecutive engine starts. Further, each starter motor may be engageable with the ring gear to start the engine and may produce a respective wear pattern on the ring gear and the starter motors may be positioned so as to minimize overlap between the respective wear patterns produced by the starter motors. Additionally, there may be first and second starter motors and the two starter motors may be used in an alternating sequence.

The engine may be a four cylinder, four stroke engine and the second starter motor may be positioned relative to the position of the first starter motor at an angle in the range of 60 to 120 degrees measured in the direction of rotation of the ring gear so as to minimize overlap between the respective wear patterns produced by the two starter motors. The engine may be a four cylinder, four stroke engine and the second starter motor may be positioned relative to the position of the first starter motor at an angle in a range of 240 to 300 degrees measured in the direction of rotation of the ring gear so as to minimize overlap between the respective wear patterns produced by the two starter motors.

The apparatus may comprise two starter ring gears fastened to the flywheel and at least two starter motors associated with each ring gear, each starter motor having a pinion wheel for selective engagement with the respective ring gear and the electronic controller may control the operation of the starter motors to equalize wear of the starter motors and reduce the number of engine starts performed by each starter motor.

The electronic controller may be further operable to check whether the engine has started following the use of a respective starter motor and, if the engine has not been started by the respective starter motor, uses another starter motor to start the engine and deactivates the respective failed starter motor. The electronic controller may be further operable to provide a warning to a user of the engine that the respective starter motor has failed.

According to a third aspect of the description there is provided a motor vehicle having an apparatus constructed in accordance with said second aspect of the description.

According to a fourth aspect of the description there is provided a method for increasing the life of a starter ring gear comprising using a first starter motor in a first position for a predefined number of engine starts and then replacing the starter motor with a replacement starter motor positioned so as to produce a wear pattern having minimal overlap with a wear pattern produced by the first starter motor.

The method may further comprise using a first pair of starter motors in respective first positions for a predefined number of engine starts and then replacing the first pair of starter motors with a replacement pair of starter motors positioned so as to produce wear patterns having minimal overlap with wear patterns produced by the first pair of starter motors.

The present description may provide several advantages. In particular, the approach may extend a time between starter service intervals. Further, the approach may improve vehicle durability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1A:
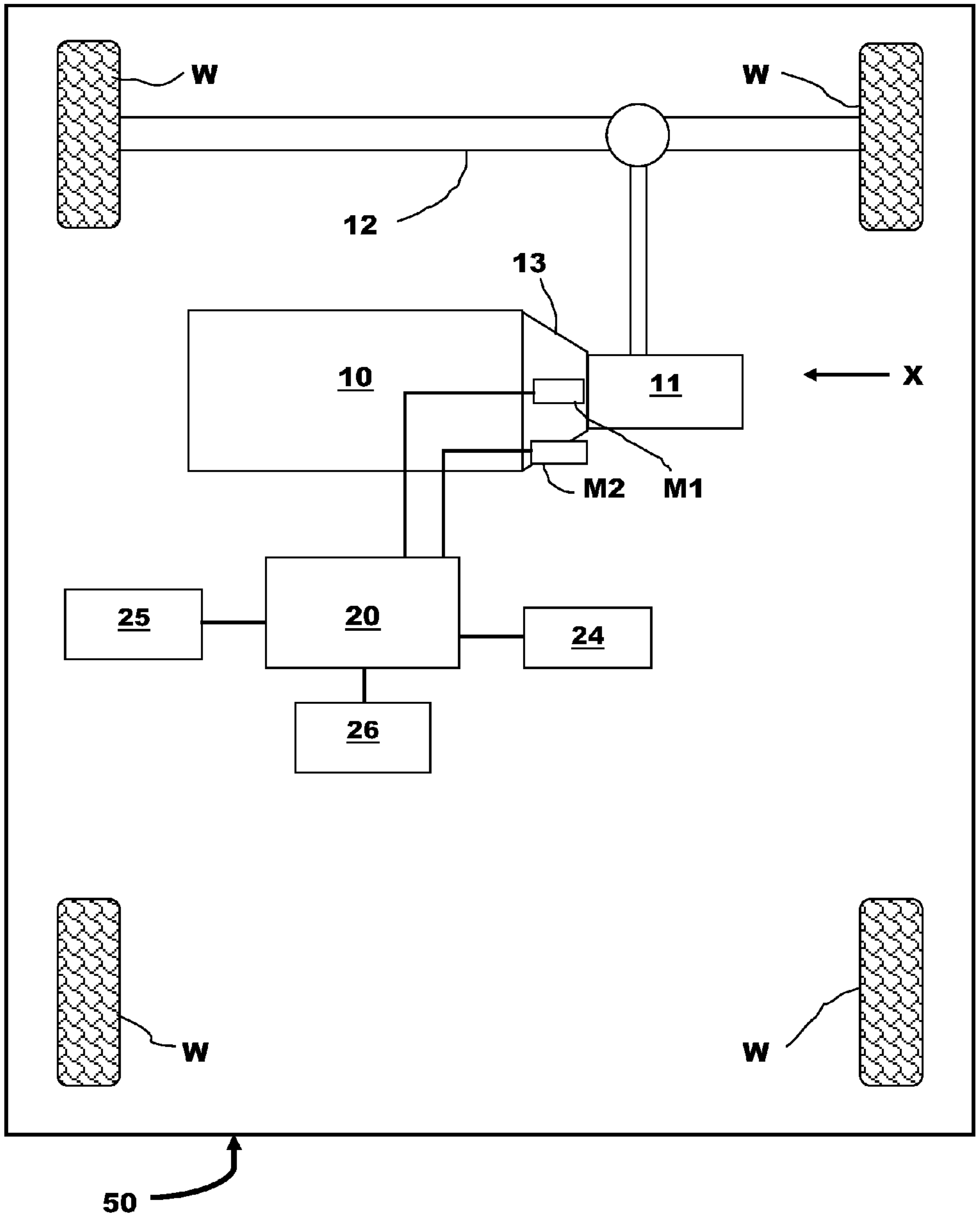
FIG. 1*a* is a schematic plan view of a motor vehicle according to a third aspect of the description having an engine starting apparatus according to a second aspect of the description.

The present description is related to starting an engine and controlling driveline torque of a hybrid vehicle. FIGS. 1*a* through 6 show example vehicle systems including starters. In one example, the engine starting system may include two starters including two pinions that advance to engage one or more flywheels. FIG. 7 shows an example method for operating the system of FIGS. 1*a* through 6 so that starter degradation may be reduced.

With reference to FIGS. 1*a* to 4*b* there is shown a motor vehicle 50 having an engine 10 driving a transmission 11 that is fastened to the engine via a casing 13. The transmission 11 has an output drivingly connected in this case to a front axle 12 driving two of four road wheels 'W' of the motor vehicle 50. It will however be appreciated that the transmission 11 could drive all four wheels of the motor vehicle 50 and/or the motor vehicle 50 could have more or less road wheels.

In the example shown, the motor vehicle 50 is a parallel electric hybrid motor vehicle having not only the engine 10 but also an electric traction motor 15 but the description is equally applicable to a conventional stop-start motor vehicle. A disconnect clutch 16 is interposed between an output from the engine 10 and the electric motor 15. A rotor shaft of the electric motor 15 is connected at one end to part of the disconnect clutch 16 and at an opposite end to an input to the transmission 11. It will be appreciated that a torque convertor could be interposed between the electric motor 15 and the transmission 11 if the transmission is a torque convertor automatic transmission.

A starting apparatus is provided for the engine 10 in the form of a pair of 12 volt starter motors M1, M2 each of which is engageable with a starter motor ring gear 8 fastened to a flywheel 7 of the engine 10. Each of the starter motors M1, M2 is mounted on the casing 13 but could alternatively be mounted on the engine 10. An electronic controller 20 is provided as part of the engine starting apparatus to control the operation of the two starter motors M1, M2.

The starter motors M1, M2 are of a conventional type and each has a respective pinion 13P, 14P that is engageable with the ring gear 8 to drive the flywheel 7 thereby starting the engine 10. U.S. Patent Publication No. 2012/0312123 shows one example of such a starter motor but many other examples exist.

Figure 4A:
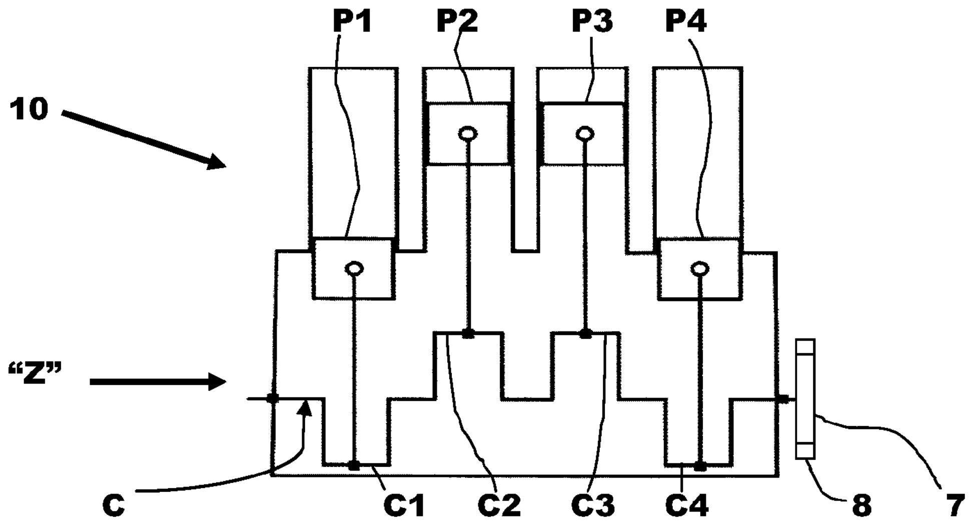
FIG. 4*a* is a diagrammatic side view of the four cylinder engine to which FIGS. 2*c* and 3 relate.
Figure 4B:
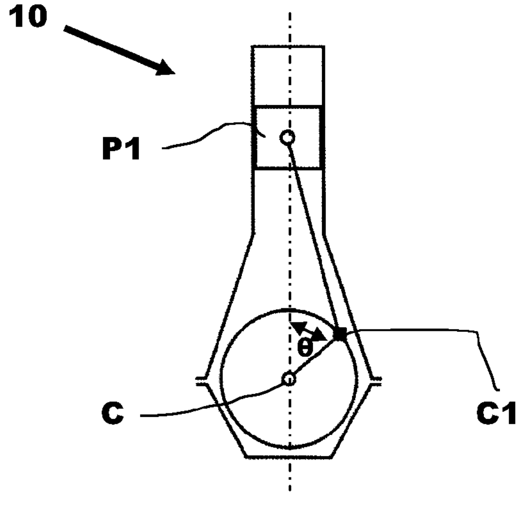
FIG. 4*b* is an end view in the direction of arrow "Z" on FIG. 4*a* of the engine shown in FIG. 4*a;*

The flywheel 7 is fastened to a crankshaft 'C' of the engine 10 which is in this example a four cylinder, four stroke diesel engine 10 as shown in FIGS. 4*a* and 4*b*.

The engine 10 has four pistons P1, P2, P3, P4 each of which is connected by a respective connecting rod to a respective crankpin C1, C2, C3, C4 of the crankshaft C. The arrangement of the crankshaft C is such that when the pistons P2 and P3 are at top dead center (TDC), the pistons P1 and P4 are at bottom dead center (BDC) as is shown in FIG. 4*a*. It will be appreciated that a crankshaft rotation of 180 degrees from the position shown will move the pistons P2 and P3 to bottom dead center and the pistons P1 and P4 to top dead center. In FIG. 4*b* the piston P1 is shown in a position where the crankshaft C has rotated an angle θ from the top dead center position placing the crank pin C1 in the position shown.

The electronic controller 20 is not only connected to the two starter motors M1, M2 but also to a user controlled starter input device such as a key switch 24, an automated starting device such as a stop-start control system 25 and to a driver interface 26 for communicating messages visually or audibly to a user of the engine 10.

The stop-start system 25 is operable to automatically shutdown the engine 10 and disengage the clutch 16 when the electric motor 15 is to be used to drive the transmission 11. The stop-start controller 25 is also operable to restart the engine 10 and engage the clutch 16 when the engine 10 is to be used to drive the transmission 11. It will be appreciated that the engine 10 and the electric motor 15 can, if desired, be used to simultaneously drive the transmission 11.

Figure 2A:
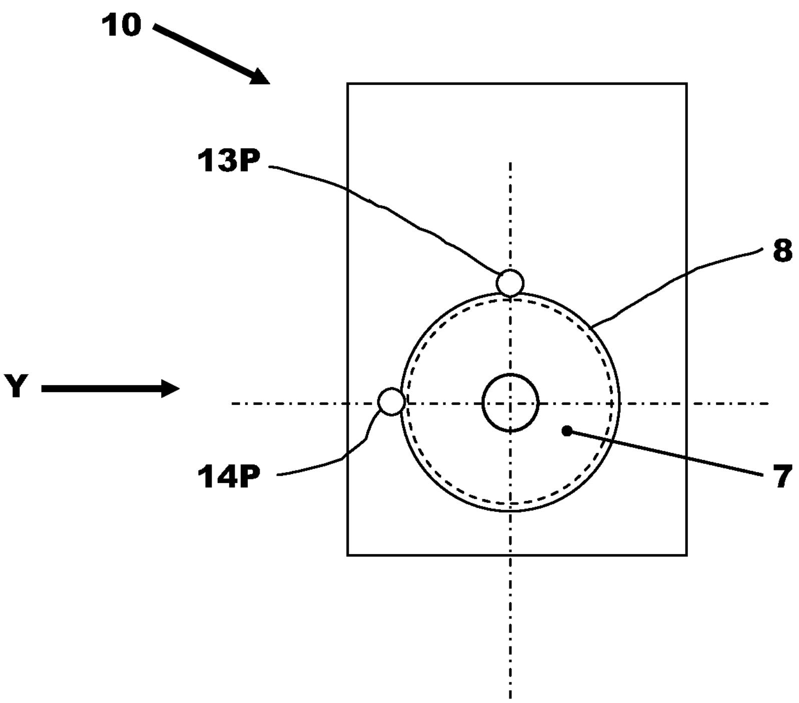
FIG. 2*a* is a schematic end view of the engine of the motor vehicle shown in FIGS. 1*a* and 1*b* in the direction of arrow 'X' on FIG. 1*a;*
Figure 2B:
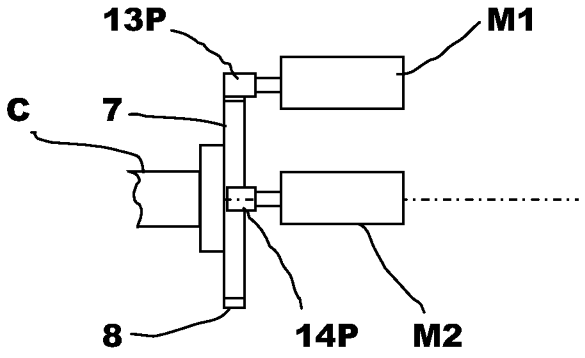
FIG. 2*b* is a schematic side view in the direction of arrow 'Y' on FIG. 2*a* of part of the engine starting apparatus.
Figure 2C:
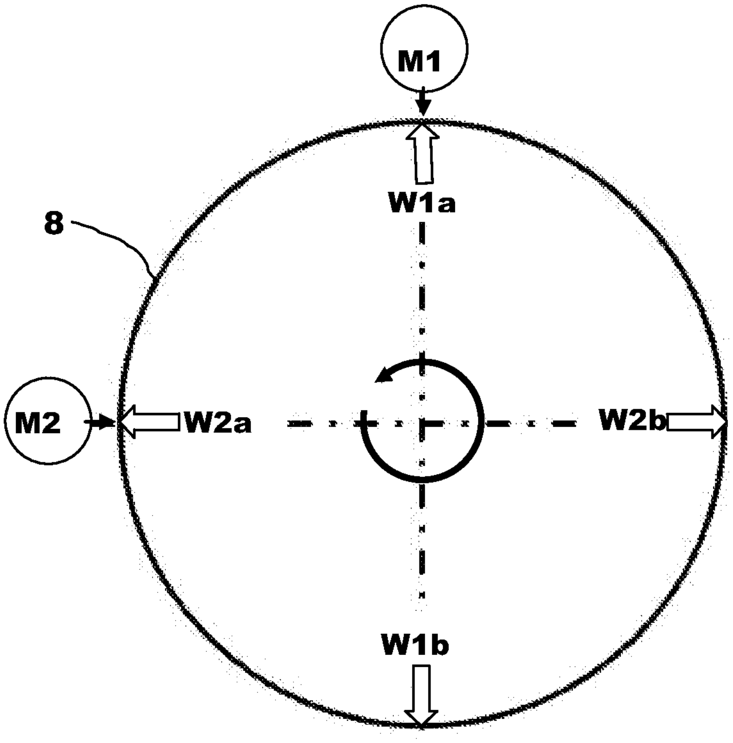
FIG. 2*c* is a diagrammatic representation of the location and associated starter motor wear positions for the engine starting apparatus shown in FIGS. 1*a* to 2*b;*

Referring now to FIG. 2*c* there is shown in a diagrammatic form the locations of the two starter motors M1, M2. In the example shown, a first starter motor M1 of the two starter motors M1, M2 is located on a vertical axis of the engine 10 and a second starter motor M2 of the two starter motors M1, M2 is positioned for engagement with the ring gear 8 relative to the angular position of the first starter motor M1 at an angle of substantially 90 degrees measured in the direction of rotation of the ring gear 8. A second preferred position exists at 270 degrees. It will be appreciated that both of these positions will produce wear patterns on the same parts of the ring gear 8 spaced 180 degrees apart.

As is well known in the art, a four cylinder, four stroke engine has a firing stroke every 180 degrees of crank rotation. Each engine has a natural stopping position that is determined by the spring back of the compressed air in the cylinder where the piston P1, P2, P3, P4 did not manage to pass top dead center and the next firing cylinder where the respective piston P1, P2, P3, P4 is in compression and opposes the backwards rotation and also the phase and magnitude of any cyclical forces required to drive camshafts or a fuel pump of the engine.

For a theoretical case where there are no camshaft or fuel pump forces and the spring back and compression forces are of substantially equal magnitude, the natural stopping position of an engine with two or more cylinders is approximately halfway between two firing strokes. For the four cylinder, four stroke engine 10 the natural stopping position would therefore be approximately at 90 degrees crankshaft rotation before TDC repeated every 180 degrees of crank rotation. It is for this reason the accumulation of ring gear wear, known as the wear pattern, is concentrated for one starter motor in two positions on a four cylinder, four stroke engine spaced 180 degrees apart.

In FIG. 2*c* the wear patterns are shown as points W1*a* and W1*b* for the first starter motor M1 and as points W2*a* and W2*b* for the second starter motor M2. It will however be appreciated that each of these wear patterns extends circumferentially around the ring gear 8 for a short distance and that the maximum wear will occur at the initial point of engagement of the pinions 13P, 14P of the starter motors M1, M2 with the ring gear 8.

Therefore the ring gear 8 will tend to wear out in the places where the starter motors M1, M2 normally make initial engagement with the ring gear 8 whereas in other places the ring gear 8 will remain nearly new as only a small number of engine start events will commence there. By positioning the two starter motors M1, M2 at a spacing of 90 degrees, the wear patterns from the starter motors M1, M2 are separated by the maximum possible amount. It will be appreciated that each wear pattern will extend in a clockwise direction as viewed from the location of initial pinion 13P, 14P engagement.

It will be appreciated that if the starter motor M2 were to be positioned at a spacing of 180 degrees from the starter motor M1 then it would wear out the same part of the ring gear 8 because its wear pattern would coincide with the wear points W1*a* and W1*b*. Similarly, if the starter motor M1 were to be positioned at a spacing of 180 degrees from the starter motor M2 then it would wear out the same part of the ring gear 8 because its wear pattern would coincide with the wear points W2*a* and W2*b*.

It will be appreciated that the angular positions of the starter motors M1, M2 relative to crank angle are not important. It is only the angular relationship between the two starter motor M1, M2 positions that is important. For example if the starter motor M1 is moved clockwise an angle "Φ" from the angular position shown then, provided the second starter motor M2 is also moved clockwise an angle "Φ" from the position shown, the same advantageous wear distribution would be produced.

That is to say, the angular orientation of the two starter motors M1, M2 relative to crankshaft position is not important provided the angular spacing between the starter motors M1, M2 is kept the same.

Figure 3:
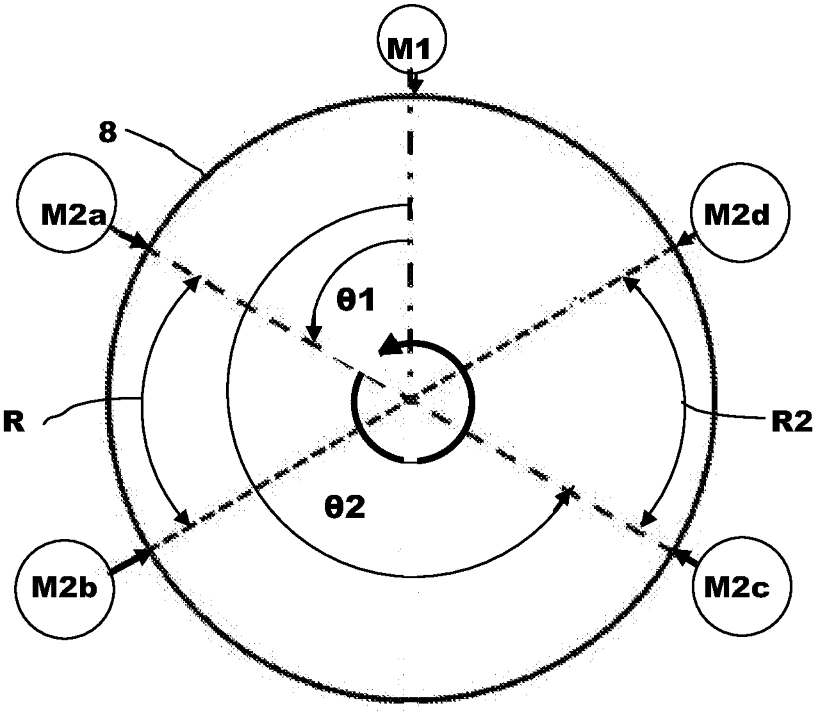
FIG. 3 is a diagrammatic representation similar to FIG. 2*c* showing preferred starter motor locations for a four cylinder, four stroke engine.

Referring now to FIG. 3, there is shown in a diagrammatic form, possible locations for the two starter motors M1, M2 based upon experimental work using a four cylinder diesel engine of the above referred to type.

In FIG. 3, as is the case for FIG. 2*c*, the starter motor M1 is used as a reference point and is positioned vertically above the center of rotation of the ring gear 8. As before, it will be appreciated that the angular positions of the starter motors M1, M2 relative to crank angle are not important. It is only the angular relationship between the two starter motor M1, M2 positions that is important. For example, if the starter motor M1 is moved clockwise an angle "Φ" from the angular position shown then, provided the second starter motor M2 is also moved clockwise an angle "Φ" from the position shown, the same advantageous wear distribution would be produced.

From the experimental work it was determined that a starter angular spacing θ1 for the second starter motor M2 measured in the direction of rotation of the ring gear 8 from the location of the first starter motor M1 in a first range 'R' of 60 to 120 degrees would result in minimal overlap between the wear patterns produced by the two starter motors M1, M2. The position of the second starter motor M2 when positioned at opposite ends of this range are indicated by the reference numerals M2*a* and M2*b*. It will be appreciated that, because the engine 10 is a four stroke, four cylinder engine, corresponding wear patterns will also occur at 180 degrees to the positions of mounting of the respective starter motor M1, M2. Therefore, if the first starter motor M1 is positioned as shown on FIG. 3, there will be wear positions located in the same positions as W1*a* and W1*b* shown on FIG. 2*c*. In the case of the second starter motor M2, if it is mounted at position M2*a* then the two corresponding wear positions will be located, one adjacent to point M2*a* and the other at 180 degrees adjacent to point M2*c*. Similarly, if the second starter motor M2 is mounted at position M2*b* then the two corresponding wear positions will be located, one adjacent to point M2*b* and the other at 180 degrees adjacent to point M2*d*.

A second range 'R2' for the starter angular spacing θ2 that is a mirror image of the first range 'R' exists between 240 and 300 degrees measured in the direction of ring gear rotation from the location of the first starter motor M1 due to the 180 degree repeating nature of the tested engine 10.

This second range 'R2' will also result in minimal overlap between the wear patterns produced by two starter motors M1, M2. The opposite ends of this second range 'R2' are indicated on FIG. 3 by the reference numerals M2*c* and M2*d*.

As before corresponding wear patterns will occur at 180 degrees to the positions of mounting of the respective starter motor M1, M2.

Therefore if the first starter motor M1 is positioned as shown on FIG. 3, there will be wear positions located in the same positions as W1*a* and W1*b* shown on FIG. 2*c*. In the case of the second starter motor M2, if it is mounted at position M2*c* then the two corresponding wear positions will be located, one adjacent to point M2*c* and the other at 180 degrees adjacent to point M2*a*. Similarly, if the second starter motor M2 is mounted at position M2*d* then the two corresponding wear positions will be located, one adjacent to point M2*d* and the other at 180 degrees adjacent to point M2*b*.

Two particularly advantageous starter motor angular spacings (θ1, θ2) for the tested engine were found to be 102 degrees in the first range 'R' and 258 degrees in the second range 'R2' both measured in the direction of ring gear rotation from the location of the first starter motor M1.

Both of these angular spacings (θ1, θ2) produced minimal overlap between the wear patterns of the two starter motors M1, M2. It will be appreciated that these positions probably deviate from the idealized 90 and 270 degree spacings referred to with respect to FIG. 2*c* due to the effect of the additional cyclic forces acting on the engine from the camshafts and fuel pump of the engine 10.

It will be appreciated by those skilled in the art that the wear size and locations of the wear patterns will depend upon a number of factors including the number of engine cylinders, whether the engine is a two stroke or a four stroke engine and the specific construction details of the engine and the starting apparatus.

Operation of the engine starting apparatus is as follows:

The electronic controller 10 in response to an engine start signal generated either by the user of the motor vehicle 50 using the ignition switch 24 or by the stop-start system 25 activates one of the starter motors M1, M2 based upon a history and error log saved in a memory of the electronic controller 10. Provided both of the starter motors M1, M2 are working then the starter motors M1, M2 are energized in an alternating sequence so that, if the last start was performed using Starter motor M1, the next engine start will be performed using starter motor M2 and vice-versa.

The use of an alternating sequence is advantageous in that it reduces and equalizes the wear on the two starter motors M1, M2. That is to say, the total wear each starter motor M1, M2 is exposed to is equal to the total number of engine starts carried out divided by the total number of active starter motors. Therefore in this case where there are two starter motors M1, M2, each starter motor M1, M2 is subject to half the wear it would be subject to if it was the only starter motor present provided both of the starter motors are active.

In the event that after activation of a starter motor M1, M2 the engine speed is determined not to be increasing but remains zero then this is used as an indication that the respective starter motor M1, M2 has degraded. In such a circumstance the electronic controller 10 deactivates the respective starter motor M1, M2 by generating an degradation code so that for future starts only the other starter motor M1, M2 remains active and can be used to start the engine 10.

When a starter motor M1, M2 is deactivated, the electronic controller 10 also issues a warning via the driver interface 26 indicating that there has been starter motor degradation and that the motor vehicle 50 needs to be taken to be serviced.

In the event that both of the starter motors M1, M2 degrade then the electronic controller 10 issues a system degradation warning via the driver interface 26 indicating that there has been a total starter motor degradation and that recovery of the motor vehicle 50 is required. In some examples, the electronic controller 10 may also contact a local recovery or service and provide details of the nature of the failure and the GPS coordinates of the motor vehicle 50.

If the motor vehicle 50 is a parallel hybrid motor vehicle, as is the case with the example described herein, then a further option would be to use the electric motor 15 to drag start the engine 10 if both of the starter motors M1, M2 are deemed to have degraded.

A further advantage of alternating engine starting between the two starter motors M1, M2 is that thermal heating of each starter motor M1, M2 is reduced because the starting effort is shared. Therefore, if there is a need for a high frequency of starts such as in stop-start traffic the mean temperature of each starter motor M1, M2 is reduced because less thermal heating is occurring and because each starter motor M1, M2 has a longer period of time to cool down between the starts it is used for.

Although the preferred option is to use the starter motors in an alternating sequence, there are other options that could be used to obtain the increased starter motor wear life benefits of the description. For example, one starter motor could be used for a predefined number of starts and then the other starter motor would be used for the same predefined number of starts and then the sequence is repeated. As yet another alternative, one starter motor could be used until a predicted life expectancy has been reached and then the other starter motor is used.

In all cases it is preferred if the number of starts performed by a respective starter motor is substantially the same as the number of starts performed by any other starter motor so as to even out wear of both the starter motors and the ring gear.

Although the description has been described by way of example with reference to a four cylinder, four stroke engine, it will be appreciated that it could be applied to engines having a different number of cylinders. However, in such a case the angular spacing of the starter motors would need to be selected to suit the characteristics of the engine. For example in the case of a six cylinder engine an angular spacing of 60 degrees rather than 90 degrees may be more appropriate as the firing cycle repeats every 120 degrees and not every 180 degrees.

Similarly, if more than two starter motors are used a different angular spacing would be required. For a four cylinder, four stroke engine a starter motor angular spacing of 60 degrees is theoretically appropriate if three starter motors are used. The practical number of starter motors that can be used is dependent upon the circumferential length of the wear pattern for each starter motor and the total circumference of the respective ring gear. More than two starter motors utilizing a single ring gear therefore requires a relatively large ring gear circumference and so is only likely to be applicable to larger engines such as commercial vehicle diesel engines or marine diesel engines.

Figure 5:
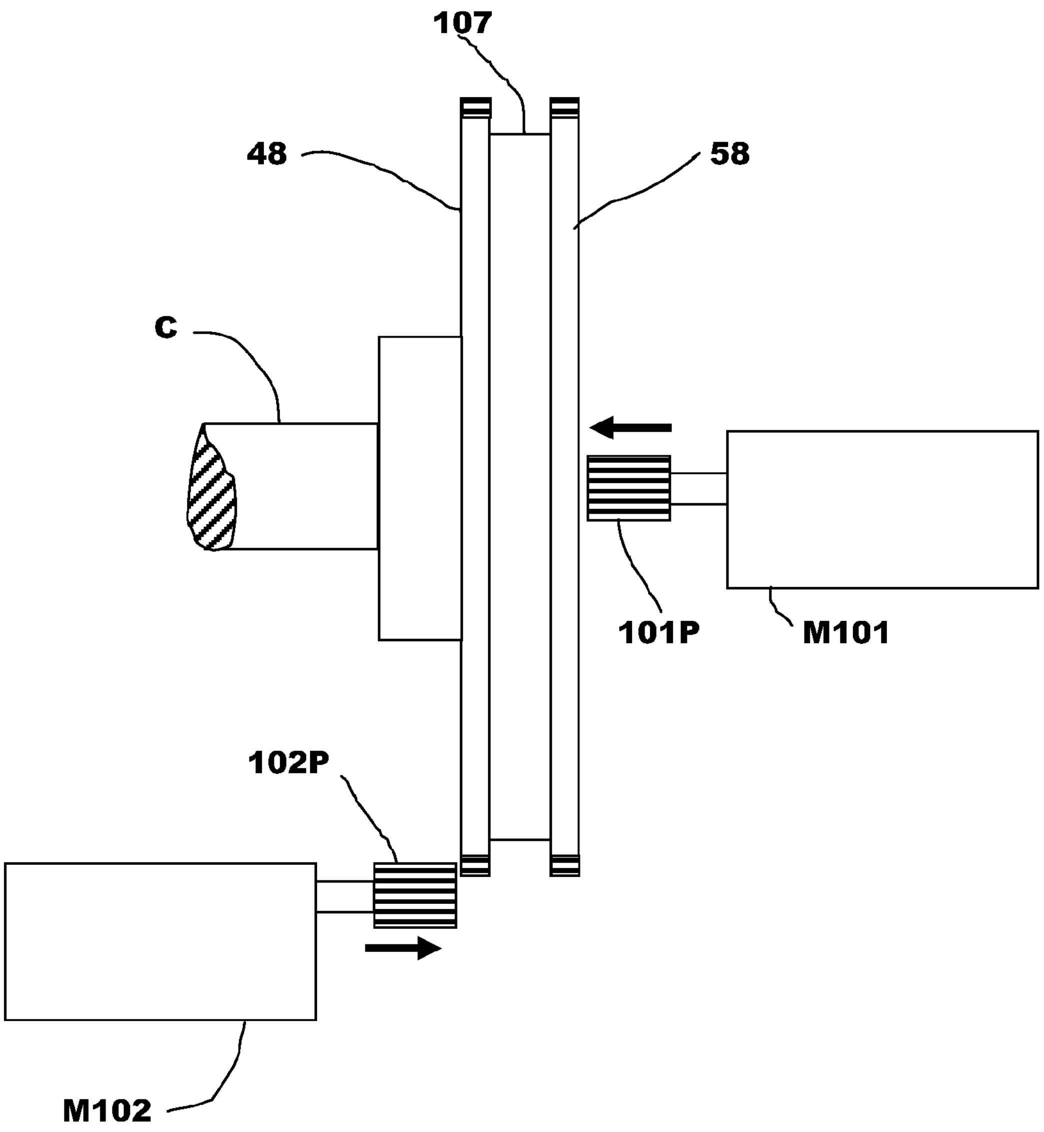
FIG. 5 is a schematic side view of a first embodiment of a duplex ring gear arrangement for use in an engine starting apparatus according to the description.
Figure 6:
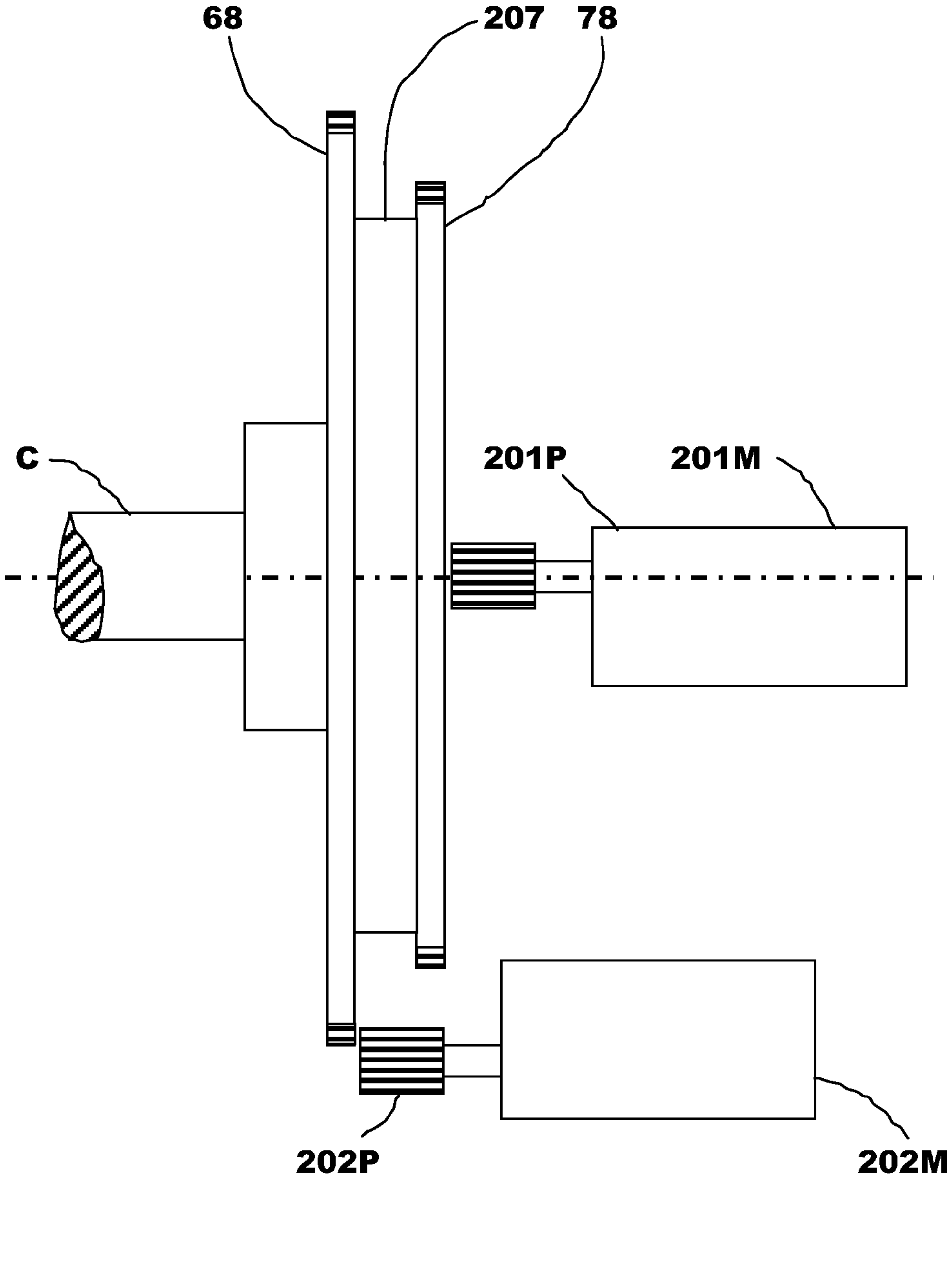
FIG. 6 is a schematic side view of a second embodiment of a duplex ring gear arrangement for use in an engine starting apparatus according to the description.
Figure 7:
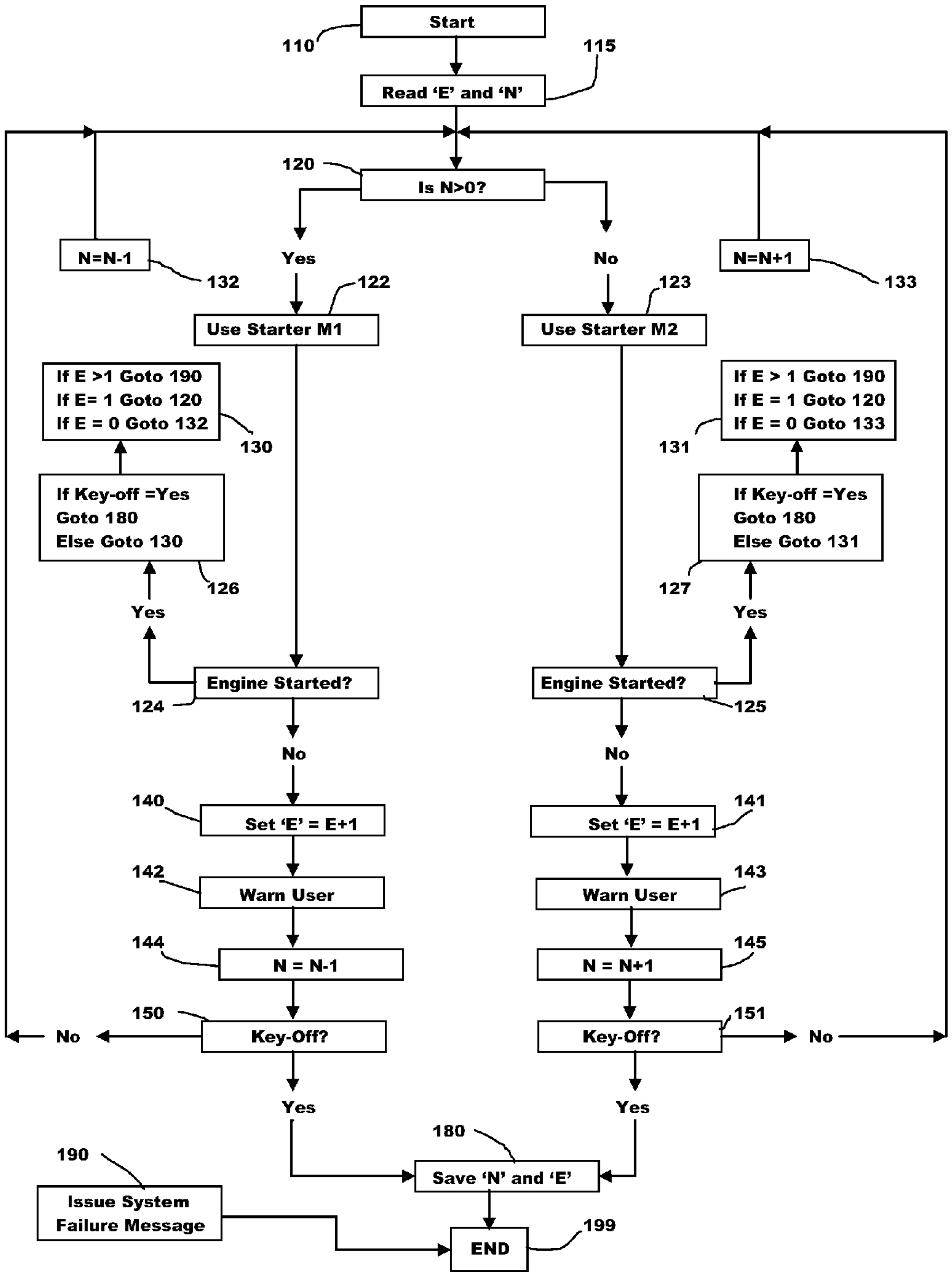
FIG. 7 is a high level flow chart of a method for starting an engine in accordance with a first aspect of the description.

In order to overcome this size restriction problem the inventors propose, as shown in FIGS. 5 and 6, to use two ring gears instead of one.

Referring to FIG. 5, there is shown a first example of a duplex ring gear arrangement having first and second ring gears 48, 58 each of which is fastened to a flywheel 7 attached to one end of a crankshaft C. The first ring gear 48 has two starter motors M102 associated with it of which only one is shown. Each of the starter motors M102 has a respective pinion 102P for engagement with the first ring gear 48. The angular spacing of the two starter motors M102 is, as previously described, chosen to minimize overlap between the wear patterns produced by the two starter motors M102. Therefore, if the engine to which the flywheel 7 is attached is a four cylinder, four stroke engine, a suitable angular spacing between the two starter motors M102 would be in the range 60 to 120 degrees or 240 to 300 degrees measured from one of the starter motors M102 to the other.

The second ring gear 58 has two starter motors M101 associated with it of which only one is shown. Each of the starter motors M101 has a respective pinion 101P for engagement with the first ring gear 58. The angular spacing of the two starter motors M101 is, as previously described, chosen to minimize overlap between the wear patterns produced by the two starter motors M101. Therefore, if the engine to which the flywheel 7 is attached is a four cylinder, four stroke engine, a suitable angular spacing between the two starter motors M101 would be in the range 60 to 120 degrees or 240 to 300 degrees measured from one of the starter motors M101 to the other.

The relative positions of the starter motors M101 to the starter motors M102 is not important other than from a packaging viewpoint it is only the angular spacing between the two starter motors acting on each ring gear 48, 58 that is important. In the example shown, there is an angular displacement of 90 degrees between the starter motors M101 and the starter motors M102; however, it will be appreciated that they could be aligned with one another or displaced with respect to one another at any other angle.

One feature of this example is that the starter motors M102 that cooperate with the first ring gear 48 are positioned to the engine side of the flywheel 107 and the starter motors M101 that cooperate with the second ring gear 48 are positioned on the opposite side of the flywheel 107 allowing a greater flexibility in the positioning of the two sets of starter motors M101, M101.

Referring to FIG. 6, there is shown a second example of a duplex ring gear arrangement having first and second ring gears 68, 78 each of which is fastened to a flywheel 207 attached to one end of a crankshaft C.

The first ring gear 68 has two starter motors M202 associated with it of which only one is shown. Each of the starter motors M202 has a respective pinion 202P for engagement with the first ring gear 68. The angular spacing of the two starter motors M202 is, as previously described, chosen to minimize overlap between the wear patterns produced by the two starter motors M202. Therefore, if the engine to which the flywheel 207 is attached is a four cylinder, four stroke engine, then suitable angular spacing for the two starter motors M202 would be in the ranges of 60 to 120 and 240 to 300 degrees measured from one of the starter motors M102 to the other.

The second ring gear 78 has two starter motors M201 associated with it of which only one is shown. Each of the starter motors M201 has a respective pinion 201P for engagement with the first ring gear 78. The angular spacing of the two starter motors M201 is, as previously described, chosen to minimize overlap between the wear patterns produced by the two starter motors M201. Therefore, if the engine to which the flywheel 207 is attached is a four cylinder, four stroke engine, a suitable angular spacing for the two starter motors M201 would be in the ranges of 60 to 120 and 240 to 300 degrees measured from one of the starter motors M201 to the other.

The relative positions of the starter motors M201 to the starter motors M202 is not important other than from a packaging viewpoint it is only the angular spacing between the two starter motors acting on each ring gear 68, 78 that is important. In the example shown, there is a rotational displacement of 90 degrees between the starter motors M201 and the starter motors M202. It will be appreciated that they could be positioned at another angle but with this embodiment the fact that both sets of starter motors M201, M202 are positioned on the same side of the flywheel 207 will restrict the positioning of the respective starter motors M201, M202.

Although the first ring gear 68 is of a different diameter to the second ring gear 78 the gearing between the starter motors M202, M201 and the respective ring gears 68, 78 is configured to be the same.

Operation of the two examples shown in FIGS. 5 and 6 is much as previously described but in this case there are two sets of two starter motors M101, M102; M201, M202 rather than just one set of two starter motors M1, M2. This arrangement provides several alternative modes of operation.

One mode of operation is to use the two starter motors M102, M202 associated with the first ring gears 48, 68 first in the manner described above, that is to say, in an alternating sequence and then after their expected service life has been reached switch over to the two starter motors M101, M201 associated with the second ring gears 58, 78 and operate them in the manner described above, that is to say, in an alternating sequence.

A second mode of operation is the reverse of the first using the second ring gears 58, 78 first and then the first ring gears 48, 68 second.

A third mode of operation is to use all four starter motors M101, M102, M201, M202 in an alternating sequence such as M101, M102, M210, M202, M101 etc. or M101, M201, M102, M202, M101 etc. Whichever mode of operation is used the aim is to even out wear between the starter motors M101, M102 and M201, M202 thereby increasing their life and increasing the life of the respective ring gears, 48, 58 and 68, 78.

As an alternative to the use of two or more starter motors in an alternating sequence as previously described a single starter motor could be used and more than one mounting position be provided for the starter motor. In such a case, a first starter motor is used until a predicted operational reliable working life has expired. The starter motor is then replaced by a second starter motor positioned in the alternative position. The life of the ring gear is extended by re-positioning the starter motor and it is relatively straightforward to replace a starter motor whereas to replace a ring gear is more time consuming and hence more expensive. In the case of a four cylinder, four stroke engine the first starter motor could be positioned as referred to with respect to the starter motor M1 shown in FIGS. 2*c* and 3 and the replacement starter motor could be positioned as referred to with respect to the second starter motor M2 shown in FIGS. 2*c* and 3.

A method for increasing the life of a starter ring gear can therefore be provided by mounting a first starter motor in a first position for a predefined number of engine starts or until it fails and then replacing the starter motor with a replacement starter motor positioned so as to produce a wear pattern having minimal overlap with a wear pattern produced by the first starter motor. It will be appreciated that, depending upon the wear pattern sizes produced and the circumference of the ring gear, it may be possible to replace the replacement starter motor with a further replacement starter motor positioned to avoid, so far as possible, the wear patterns produced by the first and replacement starter motors.

As yet another alternative a first pair of starter motors could be mounted in respective first positions for a predefined number of engine starts or until they fail. The first pair of starter motors could then be replaced by a second pair of starter motors positioned so as to produce wear patterns having minimal overlap with wear patterns produced by the first pair of starter motors.

With reference to FIG. 7, there is shown one example of a method for starting an engine in accordance with the description that could be embodied as software in an electronic controller such as the electronic controller 10. For example, the method of FIG. 7 may be stored in non-transitory memory as executable instructions.

The method commences at box 110 in which an engine start request is generated either by the driver via the ignition key 24 or by a start-stop system 25.

Values of "N" and "E" are then read in box 115 from, for example, a memory in the electronic controller 10. In this case, which is the first execution of the method, the value of zero is used for both "N" and "E". The value of "N" will flip between 0 and 1 and is used to determine which of two starter motors M1, M2 is to be used to start the engine 10. The value of "E" is an error indicator in which E=0 when no errors have been detected, E=1 when one error has been detected and E=2 when two errors have been detected. It will be appreciated that the use of "N" and "E" are only provided by way of example and alternative logic and process control mechanisms could be used without departing from the scope of the description.

From box 115 the method advances to box 120 where the value of "N" is compared in this case with zero. However, it will be appreciated that other logic could be used. If "N"=1 then the logic of box 120 demands that the method will advance to box 122 because N is greater than zero. If "N"=0 then the logic of box 120 demands that the method will advance to box 123 because N is not greater than zero.

Dealing first with a 'Yes' result from box 120. In box 122 starting of the engine 10 using the first starter motor M1 is attempted and then in box 124 it is checked whether the engine 10 has started. This check could be achieved in various means but one simple means is to check whether the engine 10 is rotating at a speed above a predefined value.

If the engine 10 has been successfully started then the method advances to box 126 where a check is made to confirm whether the ignition switch 24 is in an 'off' position. If the ignition switch 24 is not 'off' the method advances to box 130 and, if the ignition switch 24 is 'off', the method ends at 199 after saving the current values of "N" and "E" in box 180.

In box 130 the current value of the error indicator "E" is checked using a triple test to determine whether "E" is equal to zero, equal to one or more than one. If the current value of "E" is zero this indicates that no errors are present and the method will advance to box 132 where the current value of "N" is reduced by one so that it is now zero. The method then returns to box 120.

If the current value of "E" is equal to one in box 130 this indicates that there has previously been one unsuccessful attempt to start the engine 10 using the second starter motor M2 and so all subsequent starts must be made with the first starter motor M1 until the second starter motor M2 has been replaced or serviced. Therefore, in this case, the method returns directly from box 130 to box 120 without passing through box 132 and the current value of "N" is retained.

When the first starter motor M1 is serviced or repaired the error indicator is set to zero by, for example, the use of an external device such as a diagnostics analyzer that is connected to the electronic controller 10. If the current value of "E" in box 130 is equal to two then this indicates that there have previously been two unsuccessful attempts to start the engine 10, one using each of the two starter motors M1, M2. That is to say, both starter motors M1, M2 are inactive and so starting of the engine 10 is not possible. In such a case the only option is to inform the driver of this fact. Therefore, the method advances from box 130 to box 190 where a system degraded message is provided via the driver interface 26 and the method ends at box 199.

Referring back now to box 124, if the engine 10 has not started using the first starter motor M1 then the first starter motor M1 is now no longer active and no further use should be made of the first starter motor M1. It will however be appreciated that in other examples more than one failed start could be permitted before deactivating the starter motor M1. Alternatively, the starter motor M1 could be deactivated only for the current key-on cycle and could then be retested at the next key-on cycle and be permanently deactivated if it again fails to start the engine 10.

Continuing from box 124 the method advances to box 140 where the error indicator "E" is incremented by one and then on to box 142 where the user of the motor vehicle 50 is warned that there has been a starter motor degradation and that service/replacement is required.

The method then advances from box 142 to box 144 where the value of "N" is decreased by one so that it is now zero and then the method advances to box 150 to check whether a key-off state is present. If the ignition key 26 has been moved to an off position, the method ends in box 199 after first saving the current values of "N" and "E".

Although not specifically shown in FIG. 7, whenever a key-off event occurs the current values of "N" and "E" are saved before the method ends. If the result of the test in box 150 is that a Key-off event has not occurred, the method returns directly from box 150 to box 120. If the method returns to box 120 via box 132 or box 150 the value of "N" is always zero and so the next cycle will always use the second starter motor M2. This is because if the value of "N" is equal to zero the result of the test in box 120 will be a 'No' result.

If however the method advances from box 130 directly to box 120 the value of "N" will remain as one and the first starter motor M1 will be used again. This will only occur if the error indicator "E" has been set to one which indicates that at a previous start the second starter motor M2 failed to start the engine 10 resulting in the box 141 being executed.

In this way alternate use of the starter motors M1, M2 is provided for until the starter motor M2 fails at which time the working starter motor M1 is used for all starts until the deactivated starter motor M2 is replaced or repaired.

Referring now to box 123, starting of the engine 10 using the second starter motor M2 is attempted and then in box 125 it is checked whether the engine 10 has started.

If the engine 10 has been successfully started then the method advances to box 127 where a check is made to confirm whether the ignition switch 24 is in an 'off' position. If the ignition switch 24 is not 'off', the method advances to box 131 and, if the ignition switch 24 is 'off', the method ends at 199 after saving the current values of "N" and "E" in box 180.

In box 131 the current value of the error indicator "E" is checked using a triple test to determine whether "E" is equal to zero, equal to one or more than one. If the current value of "E" is 0 this indicates that no errors are present and the method advances to box 133 where the current value of "N" is incremented by one so that it is now one. The method then returns to box 120. If the current value of "E" is equal to one this indicates that there has previously been one unsuccessful attempt to start the engine 10 using the first starter motor M1. Therefore, all subsequent starts must be made with the second starter motor M2 until the first starter motor M1 has been replaced or serviced. Therefore, in this case, the method returns directly from box 131 to box 120 without passing through box 133 and the current value of "N" is retained.

At the time the first starter motor M1 is repaired or replaced, the error indicator "E" is set to zero by, for example, the use of an external device such as a diagnostics analyzer that is connected to the electronic controller 10.

If the current value of "E" is equal to two this indicates that there have previously been two unsuccessful attempts to start the engine 10, one using each of the two starter motors M1, M2. That is to say, both starter motors M1, M2 are inactive and so starting of the engine 10 is not possible. In such a case the only option is to inform the driver of this fact. The method therefore advances from box 131 to box 190 where a system degraded message is provided via the driver interface 26 and the method then ends at box 199.

Referring back now to box 125, if the engine 10 has not started then the second starter motor M2 is now no longer active and so it is preferable if no further use is made of the second starter motor M2. It will be appreciated that more than one unsuccessful start could be permitted before deactivating the starter motor M2. As yet another alternative, the starter motor M2 could be deactivated only for the current key-on cycle. It could then be retested at the next key-on cycle and be permanently deactivated if it again does not start engine 10.

Continuing from box 125 the method advances to box 141 where the error indicator "E" is incremented by one and then on to box 143 where the user of the motor vehicle 50 is warned that there has been a starter motor degradation and that service or replacement is desired.

The method then advances from box 143 to box 145 where the value of "N" is incremented by one so that it now has a value of one and then the method advances to box 151 to check whether a key-off state is present. If the ignition key 26 has been moved to an 'off' position then the method ends in box 199 after first saving the current values of "N" and "E". If the result of the test in box 151 is that a Key-off event has not occurred, the method returns from box 151 to box 120. If the method returns to box 120 via box 133 or box 151 the value of "N" is always one and so the next cycle will always use the first starter motor M1. This is because if the value of "N" is equal to one the result of the test in box 120 will be a 'Yes' result.

If however the method advances from box 131 directly to box 120 the value of "N" will remain as zero and the second starter motor M2 will be used again. This will only occur if the error indicator "E" has been set to one which indicates that at a previous start the first starter motor M1 failed to start the engine 10 resulting in the box 140 being executed.

In this way, alternate use of the starter motors M1, M2 is provided until the starter motor M1 is degraded at which time the working starter motor M2 is used for all starts until the deactivated starter motor M1 is serviced or repaired.

In boxes 130 and 131 one of the results in both cases is to go directly to box 190. This result will only occur if both of the boxes 140 and 141 have been traversed at least once. That is to say, the first starter motor M1 has failed to start the engine 10 and then the second starter motor M2 has failed to start the engine 10 or the second starter motor M2 has failed to start the engine 10 and then the first starter motor M1 has failed to start the engine 10.

Figure 1B:
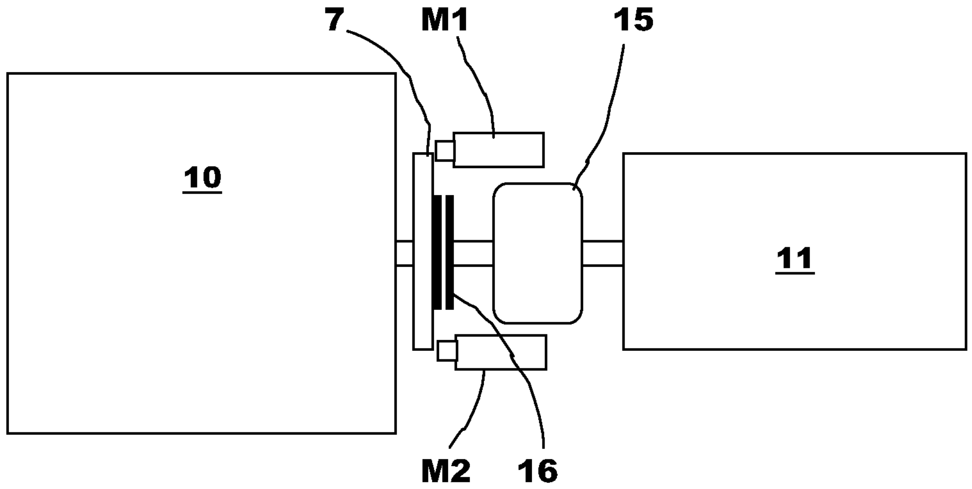
FIG. 1*b* is a schematic plan view showing an engine and transmission forming part of the motor vehicle shown in FIG. 1*a* on an enlarged scale when the motor vehicle is configured as a parallel hybrid vehicle.

A parallel hybrid system such as that shown in FIG. 1*b* requires a diesel engine starting system with a high cycle durability to restart the engine 10 when the vehicle is driven electrically and driver demand exceeds the electrical capability. It is known to "drag start" an engine such as the engine 10 by partially closing the disconnect clutch 16 so the engine speed is dragged up with the electric motor 15. A substantial portion of available electric torque must be held in reserve because the warm cranking torque of a diesel engine 10 is in the region of 175-200 Nm peak and the electric motor 16 is capable of producing a peak torque of circa 250 Nm. Therefore only 50-75 Nm of torque is available for propulsion of the motor vehicle 50 if the electric motor 15 is being used to start the engine 10 and this is an ineffective use of the electrical system. By using a twin starter motor arrangement as described herein the full torque capacity of the electric motor 15 can be used during the period when the engine 10 is being started. This produces a number of advantages as detailed below in Table 1.

TABLE 1

| "Dual Starter" | "Drag Start" |
|---|---|
| No driveline torque interruption when handing over from electrical power to diesel propulsion. | Driveline torque interruption when handing over from electrical power to diesel propulsion. |
| Full electrical torque available for propulsion of the vehicle, maximizing fuel saving capability. | Electrical torque available for propulsion of the vehicle is restricted thereby severely restricting the fuel saving capability of the electric motor. |
| Faster throttle response. | Slower throttle response. |
| Less durable disconnect clutch required due to minimal clutch slip during synchronization | More durable disconnect clutch required due to the use of the clutch for drag start |
| Very repeatable restart quality. | Inconsistent restart quality due to: 1. variable electric motor speed due to varying driver demand; 2. clutch engagement variation due to wear, temperature and humidity; and 3. variable vehicle mass. |
| Redundancy because 2 starters are provided to start the engine. | No redundancy if the electric motor fails. It is not then possible to drag start the engine. |

Therefore in summary, the inventors have realized that with a conventional single starter motor and ring gear arrangement, the wear of the ring gear occurs in small areas of the ring gear and that large sections of the ring gear will remain substantially unworn. Therefore by using at least two spaced apart locations for a starter motor the life of the ring gear can be increased. In addition, by using more than one starter motor, the life of each starter motor can be increased if the starter motors share the burden of starting an engine by distributing the engine starts between the various starter motors.

As will be appreciated by one of ordinary skill in the art, method described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method of starting an engine having a starting apparatus including at least two starter motors wherein the method comprises:

sharing starting of the engine between the at least two starter motors to equalize wear of the at least two starter motors and reduce a number of engine starts performed by each starter motor, where each of the at least two starter motors is engageable with a ring gear to start the engine and produces a respective wear pattern on the ring gear and the starter motors are positioned so as to minimize overlap between the respective wear patterns produced by the starter motors.

2. The method of claim 1, where the number of starts performed by each of the at least two starter motors is equal to a total number of engine starts performed divided by a total number of active starter motors, and where each of the at least two starter motors include a pinion.

3. The method of claim 2, where no active starter motor is used for two consecutive engine starts.

4. The method of claim 1, where there are first and second starter motors and the first and second starter motors are used in an alternating sequence.

5. The method of claim 4, where the method further comprises determining whether the engine has started following the use of a respective starter motor and, if the engine has not been started by the respective starter motor, using another starter motor to start the engine and deactivating the respective starter motor that is determined to be degraded.

6. The method of claim 5, where the method further comprises providing a warning to a user of the engine that the respective starter motor has degraded.

7. The method of claim 6, where the method further comprises providing a warning to a user of the engine of a total system degradation if all of the engine starter motors have not started the engine.

8. An apparatus for starting an internal combustion engine having a flywheel connected to a crankshaft of the engine, the apparatus comprising:

a starter ring gear fastened to the flywheel, at least two starter motors each having a pinion wheel for selective engagement with the ring gear and an electronic controller to control operation of the starter motors, where the electronic controller includes instructions to use the starter motors in a predefined sequence to equalize wear of the starter motors and reduce a number of starts performed by each starter motor; and where each of the at least two starter motors is engageable with the ring gear to start the engine and produces a respective wear pattern on the ring gear, and where the starter motors are positioned so as to minimize overlap between the respective wear patterns produced by the starter motors.

9. The apparatus of claim 8, where the electronic controller includes further instructions to operate the starter motors so that a number of starts performed by each of the at least two starter motors is equal to a total number of engine starts performed divided by the total number of active starter motors.

10. The apparatus of claim 9, where the electronic controller includes additional instructions for providing no active starter motor to be used to start the engine for two consecutive engine starts.

11. The apparatus of claim 8, where the controller includes additional instructions for activating a first and second starter motor in an alternating sequence.

12. The apparatus of claim 11, where the engine is a four cylinder, four stroke engine and the second starter motor is positioned relative to a position of the first starter motor at an angle in the range of 60 to 120 degrees measured in a direction of rotation of the ring gear so as to minimize overlap between the respective wear patterns produced by the first and second starter motors.

13. The apparatus of claim 11, where the engine is a four cylinder, four stroke engine and the second starter motor is positioned relative to a position of the first starter motor at an angle in a range of 240 to 300 degrees measured in a direction of rotation of the ring gear so as to minimize overlap between the respective wear patterns produced by the first and second starter motors.

14. The apparatus of claim 13, where the apparatus comprises two starter ring gears fastened to the flywheel and at least two starter motors associated with each ring gear, each starter motor having a pinion wheel for selective engagement with the respective ring gear, where the electronic controller includes additional instructions to operate the at least two starter motors to equalize wear of the at least two starter motors and reduce a number of engine starts performed by each of the at least two starter motors.

15. The apparatus of 14, where the electronic controller includes further instructions to determine whether the engine has started following activation of a respective starter motor and, if the engine has not been started by the respective starter motor, the controller activates another starter motor to start the engine and deactivates the respective failed starter motor.

16. The apparatus of claim 15, where the electronic controller includes additional instructions to provide a warning to a user of the engine that the respective starter motor has degraded.

17. A method for increasing the life of a starter ring gear comprising:

activating a first starter motor in a first position for a predefined number of engine starts and then replacing the starter motor with a replacement starter motor positioned so as to produce a wear pattern having minimal overlap with a wear pattern produced by the first starter motor.

18. The method of claim 17, where the method further comprises activating a first pair of starter motors in respective first positions for a predefined number of engine starts and then replacing the first pair of starter motors with a replacement pair of starter motors positioned so as to produce wear patterns having minimal overlap with wear patterns produced by the first pair of starter motors.

* * * * *